United States Patent
Evans et al.

(10) Patent No.: US 12,229,101 B2
(45) Date of Patent: Feb. 18, 2025

(54) PROCESSING AND STORING DATA USING A HASH TABLE DATA STRUCTURE

(71) Applicant: METASWITCH NETWORKS LTD., Enfield (GB)

(72) Inventors: Michael Jeffrey Evans, Enfield (GB); Matthew Ian Ronald Williams, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 16 days.

(21) Appl. No.: 18/248,105

(22) PCT Filed: Oct. 8, 2021

(86) PCT No.: PCT/US2021/054303
§ 371 (c)(1),
(2) Date: Apr. 6, 2023

(87) PCT Pub. No.: WO2022/076911
PCT Pub. Date: Apr. 14, 2022

(65) Prior Publication Data
US 2024/0020289 A1    Jan. 18, 2024

(30) Foreign Application Priority Data
Oct. 8, 2020  (GB) ...................................... 2015972

(51) Int. Cl.
*G06F 12/0864*    (2016.01)
*G06F 16/22*      (2019.01)

(52) U.S. Cl.
CPC ...... *G06F 16/2255* (2019.01); *G06F 12/0864* (2013.01)

(58) Field of Classification Search
None
See application file for complete search history.

(56) References Cited

U.S. PATENT DOCUMENTS

| 10,649,852 B1 | 5/2020 | Starling et al. |
| 2008/0107259 A1 | 5/2008 | Satou |

(Continued)

FOREIGN PATENT DOCUMENTS

| WO | WO-2022076911 A1 * | 4/2022 | ........... G06F 16/137 |

OTHER PUBLICATIONS

"Compare-and-swap", Retrieved From: https://en.wikipedia.org/w/index.php?title=Compare-and-swap&oldid=884339820, Feb. 21, 2019, 7 Pages.

(Continued)

*Primary Examiner* — Brian R Peugh
(74) *Attorney, Agent, or Firm* — Han Gim; Newport IP, LLC

(57) ABSTRACT

Key data is processed using a hash table data structure. Control data storage locations have a write-availability indicated by a first write-availability state indicating that the location is available to be written to, and a second write-availability state indicating that the location is not available to be written to. A temporary label value is stored in a selected control data storage location to render the selected location and a corresponding key data storage location inactive for read-out. The write-availability of the control data storage location is changed to the second write-availability state in association with the storage of the processed label value in the selected location. A read-out label value is obtained and the temporary label value stored in the selected control data storage location is over-written with the obtained read-out label value, to render the selected control data storage location and corresponding key data storage location active for read-out.

20 Claims, 8 Drawing Sheets

(56) References Cited

U.S. PATENT DOCUMENTS

2020/0019539 A1  1/2020 Ni
2021/0058255 A1* 2/2021 Martins .................... H04L 9/14

OTHER PUBLICATIONS

"Synchronization Library", Retrieved From: https://web.archive.org/web/20190331223920/https://abseil.io/docs/cpp/guides/synchronization, Mar. 31, 2019, 16 Pages.
"Notice of Allowance Issued in United Kingdom Patent Application No. 2015972.9", Mailed Date: Feb. 1, 2023, 2 Pages.
"Office Action Issued in United Kingdom Patent Application No. 2015972.9", Mailed Date: Dec. 5, 2022, 3 Pages.
"Office Action Issued in United Kingdom Patent Application No. 2015972.9", Mailed Date: Nov. 25, 2020, 5 Pages.
Benzaquen, et al., "Swiss Tables and absl :: Hash", Retrieved From: https://web.archive.org/web/20190331003059/ https://abseil.io/blog/20180927-swisstables, Mar. 31, 2019, 3 Pages.
Maier, et al., "Concurrent Hash Tables: Fast and General(?)!", In Journal of ACM Transactions on Parallel Computing, vol. 5, Issue 4, Feb. 22, 2019, 32 Pages.
"International Search Report and Written Opinion Issued in PCT Application No. PCT/US21/054303", Mailed Date: Feb. 3, 2022, 15 Pages.
Popovitch, Gregory, "The Parallel Hashmap", Retrieved From: https://web.archive.org/web/20190330063547/ https://greg7mdp.github.io/parallel-hashmap/, Mar. 10, 2019, 8 Pages.

* cited by examiner

PROCESSING AND STORING DATA USING A HASH TABLE DATA STRUCTURE

CROSS-REFERENCE TO RELATED APPLICATION

This application is a national stage application, filed under 35 U.S.C. § 371, of International Patent Application No. PCT/US21/054303, filed on Oct. 8, 2021, which claims priority to GB 2015972.9, filed on Oct. 8, 2020, both of which are incorporated by reference herein in their entirety.

TECHNICAL FIELD

The present disclosure relates to methods, apparatus and computer software for processing and storing data using a hash table data structure.

BACKGROUND

Hash tables are data structures used in computing to store data for fast retrieval. Data can be retrieved or stored in the hash table using a key which is associated with specific data stored within the hash table. When data is stored in the hash table, the key associated with the data is processed by a hash function to compute a hash value which determines a location within the hash table to store the data. Once the location is determined, the data can then be written to the location within the hash table. A key can then be used to retrieve or look-up' the data stored in the hash table. A key associated with the data is processed by the same hash function to determine the hash value providing the location within the hash table the data can be retrieved from. The data can then be read from the location of the hash table. Fast retrieval of data can be achieved despite the large number of pieces of data stored in the hash table. This is because the mechanism used to retrieve the data is independent of the number of pieces of data and the location the data is stored in. Hash tables are commonly implemented for use in database indexing, caching, programming compilation and error checking. Swiss tables are a type of hash table developed by Google which are fast, efficient and cache-friendly.

Multi-threading is the ability for a single core of a processor such as a central processing unit (CPU) to provide multiple threads of execution concurrently. Utilising multi-threaded programming allows for multiple processes to be executed in parallel. In the context of a computer system processing hash tables, multi-threaded programming allows for data to be both retrieved from and stored in the hash table within the same clock cycle. This improves the throughput of the processes associated with the hash table and results in performance gain for the computer system.

SUMMARY

According to first examples, there is provided a method of processing key data, which represents a key, using a hash table data structure, wherein the hash table data structure comprises a plurality of control data storage locations corresponding to a plurality of key data storage locations, wherein each of the plurality of control data storage locations has a write-availability indicated by a first write-availability state, which indicates that the control data storage location is available to be written to, and a second write-availability state, which indicates that the control data storage location is not available to be written to, the method comprising:

receiving the key data;
applying a hash function to at least part of the key data to determine a hash value;
obtaining a temporary label value, wherein the temporary label value has at least one bit which is different to that of a read-out label value which is to be used to identify a key data storage location on the basis of the key;
selecting a control data storage location having the first write-availability state;
storing the temporary label value in the selected control data storage location to render both the selected control data storage location and a corresponding key data storage location inactive for read-out, wherein the write-availability of the control data storage location is changed to the second write-availability state in association with the storage of the temporary label value in the selected control data storage location;
writing the key data to the key data storage location which corresponds to the selected control data storage location;
obtaining the read-out label value; and
overwriting the temporary label value stored in the selected control data storage location with the obtained read-out label value, to render both the selected control data storage location and corresponding key data storage location active for read-out.

According to second examples, there is provided a computer system comprising:

memory circuitry arranged to store key data which represents a key, a hash table data structure comprising a plurality of control data storage locations corresponding to a plurality of key data storage locations, wherein each of the plurality of control data storage locations has a write-availability indicated by a first write-availability state, which indicates that the control data storage location is available to be written to, and a second write-availability state, which indicates that the control data storage location is not available to be written to, a hash function, a hash value, a temporary label value, a predetermined operation and a read-out label value; and processing circuitry configured to:
receive the key data;
apply the hash function to at least part of the key data to determine the hash value;
obtain the temporary label value, wherein the temporary label value has at least one bit which is different to that of a read-out label value which is to be used to identify a key data storage location on the basis of the key;
select a control data storage location having the first write-availability state;
store the temporary label value in the selected control data storage location to render both the selected control data storage location and a corresponding key data storage location inactive for read-out, wherein the write-availability of the control data storage location is changed to the second write-availability state in association with the storage of the temporary label value in the selected control data storage location;
write the key data to the key data storage location which corresponds to the selected control data storage location;
obtain the read-out label value;
overwrite the temporary label value stored in the selected control data storage location with the obtained read-out label value, to render both the selected control data storage location and corresponding key data storage location active for read-out.

According to third examples, there is provided a computer program product comprising instructions which, when executed by a computer, cause the computer to perform the method according to first examples.

Further features and advantages will become apparent from the following description, given by way of example only, which is made with reference to the accompanying drawings.

DETAILED DESCRIPTION

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

When writing data to a location within a hash table, typically a large number of clock cycles are used to fully write the data. This presents a technical problem when attempting to utilise multi-threaded programming with hash tables. One thread may be attempting to read the data stored at a location of the hash table while another thread is writing to the same location. This means incorrect data may be retrieved before the correct data is written, resulting in a failure to retrieve the correct data. An existing solution to the problem of multiple threads reading/writing entries simultaneously is to use locking. A number of different locking mechanisms may be employed to ensure that the data cannot be read from whilst it is being written and it cannot be written to by more than one thread at once. Before writing data to a location within a hash table, a lock is generated and used to prevent the data being read from the location while it is being written. Once the data is fully written the lock is removed.

Locking mechanisms have a significant impact on performance where hash tables are used for computationally intensive purposes. The generation of a plurality of locks each for use at a respective location of the hash table increases memory occupancy. This introduces problems for systems which are highly memory constrained. Generating a lock which can be used to lock all locations of the hash table at once has minimal impact on memory occupancy but prevents any data from being read whilst data is being written to any location within the hash table.

Examples of the present disclosure provide solutions for utilising multi-threaded programming with hash tables whilst preventing the reading of partly written data stored in locations within the hash table which exist during the writing process.

Figure 1:
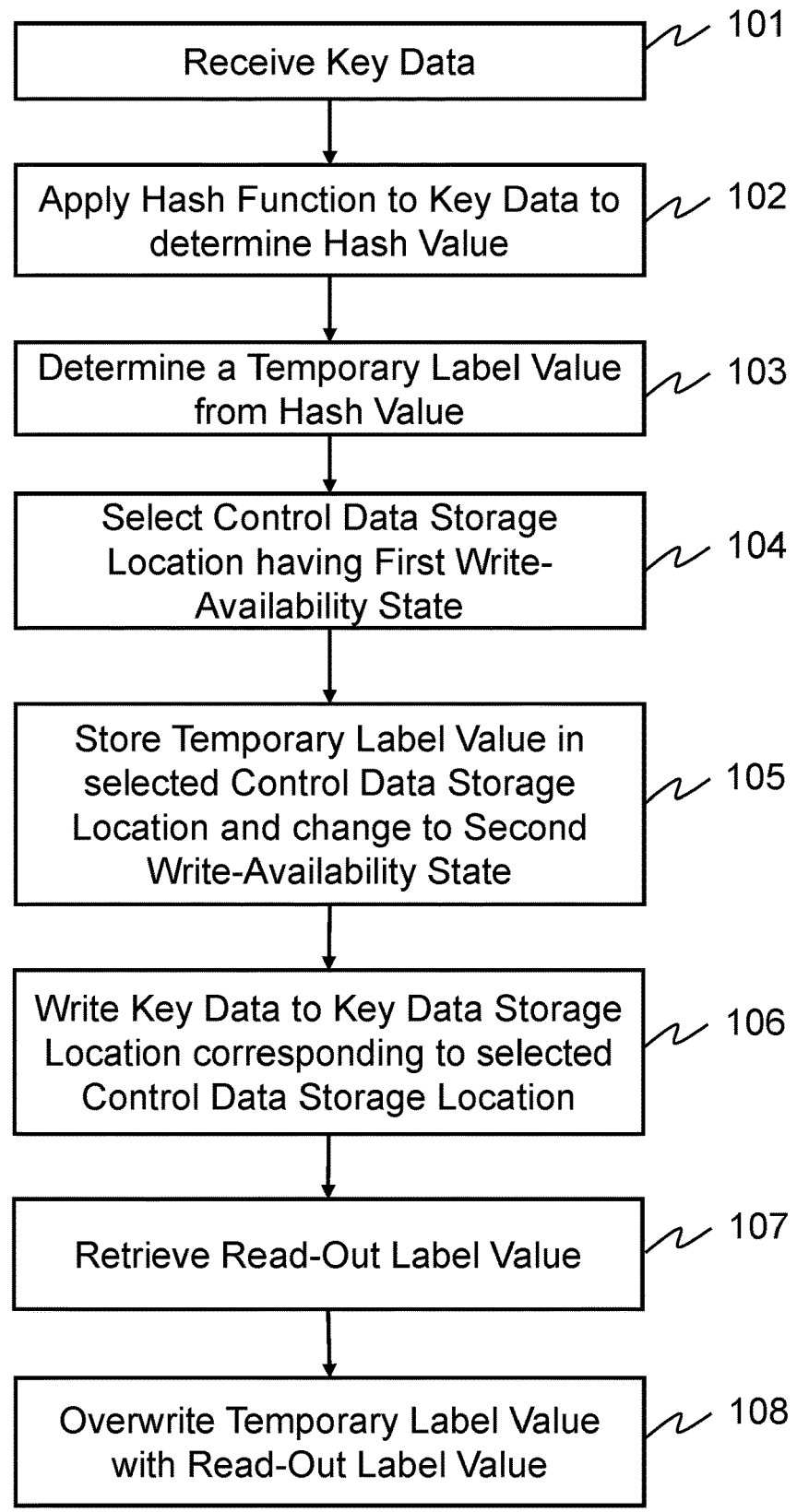
FIG. 1 shows a flow diagram representing a method of processing and storing key data in accordance with a first example of the present disclosure.

FIG. 1 shows a flow diagram representing a method of processing and storing key data in accordance with a first example of the present disclosure. The method may be performed by a computer system comprising a processor such as a CPU, the processor executing a set of instructions stored in storage circuitry such as static random access memory (SRAM) or dynamic random access memory (DRAM). The instructions may be contained within a computer program product consisting of a plurality of modules.

At block 101, key data, representing a key is received by the computer system. The key data comprises a key. The key may be associated with a hash table data structure stored within storage circuitry of the computer system, the key providing a means for identifying and accessing data stored within the hash table data structure. The key may be a string or a numerical value. For example, the key may be the name of a person. A plurality of keys may be associated with the hash table data structure stored within the storage circuitry of the computer system where each of the plurality of keys is unique, accessing data from a specific location of the hash table data structure. The key data may comprise both a key and associated data values. The received key data may be a key-value pair. For example, the key value-pair may be the name of a person and a date of birth. The key data can be operated on by the computer system. In one example, the computer system comprises a receiver to receive data packets. The data packets may be transmitted by a transceiver using a cellular network. The data packets may comprise header data and a payload. The header data may form at least part of the key data. For example, the header data may comprise a key.

The hash table data structure stored within storage circuitry of the computer system may be a type of Swiss table, as made available in Abseil, an open source collection of C++ libraries. Swiss tables are described in more detail in "Swiss Tables Design Notes" from the web site of the Abseil open source collection of C++ libraries at https://abseil.io/about/design/swisstables and in "Swiss Tables and absl::Hash" also from the website of the Abseil open source collection at https://abseil.io/blog/20180927-swisstables, the contents of which are incorporated herein by reference. The hash table data structure comprises a plurality of control data storage locations corresponding to a plurality of key data storage locations. Each of the plurality of key data storage locations is configured to store key data. Each of the plurality of control data storage locations is configured to store control data which is data associated with the key data stored in the corresponding key data storage location. The control data can be used to provide information about the key data. For example, the control data may be used to access the corresponding key data stored within the hash table. Each of the plurality of control data storage locations has a write-availability. The write-availability is indicated by a first and second write-availability state. The first write-availability state indicates that the control data storage location is available to be written to. The second write-availability state indicates that the control data storage location is not available to be written to. The write-availability of each of the plurality of control data storage locations may be indicated by a 1-bit flag stored within each of the control data storage locations, preferably in a most significant bit of each of the storage locations. When the flag has a value of '1' (one) the control data storage location has a write-availability in the first state and is available to be written to. When the flag has a value of '0' (zero) the control data storage location has a write-availability in the second state and is not available to be written to. This enables use of vector processing instructions such as Advanced Vector Extensions (AVX) instructions to look up an entry matching a particular label value, as the whole byte will match the label value being looked up, rather than having a '1' in the most significant bit. The write availability of each of the control data storage locations also applies to the corresponding key data storage location. For example, when a control data storage location stores a 1-bit flag indicating that the control data storage location is not available to be written to, the corresponding key data storage location is also not available to be written to.

Each of the control data storage locations and key data storage locations exists within storage circuitry of the computer system. Each of the control data storage locations and key data storage locations may be associated with a unique memory address. In one example, each control data storage location and corresponding key data storage location has a memory address adjacent in the storage circuitry. In a further example, the plurality of control data storage locations have memory addresses which are in series and adjacent to the plurality of key data storage locations which have memory addresses which are also in series.

At block 102 a hash function is applied to the received key data to determine a hash value. The hash function is applied to at least part of the key data to determine the hash value. For example, the key data may comprise a key and associated data values where the hash function is applied to the key to generate a hash value. The hash function is a mathematical function which maps at least part of the key data to a hash value. The hash function may convert part of the key data of arbitrary length to a hash value of fixed length. The hash value may be smaller in length than the part of the key data used to determine it. The hash function may be a message digest (MD) hash function, secure hash function (SHA), RACE integrity primitives evaluation message digest (RIPEMD) hash function or whirlpool hash function. The hash function will be configured such that each unique key processed by the hash function produces a predetermined hash value. In one example, the algorithm starts out with a 512 bit key. It then takes alternate 64 bit sections of this and sums them to form a single 64 bit number and hashes this using a 64-bit xxhash.

At block 103 the hash value is used to determine a temporary label value. The hash value may also be used to determine a read-out label value. The temporary label value has at least one bit which is different to that of the read-out label value. In one example, the hash value comprises 64-bits with the final 7-bits of the hash value being used as the read-out label value. The hash value may be used to determine the read-out label value first and the read-out label value may then be used to determine the temporary label value. The read-out label value may be processed using a reversible operation to determine the temporary label value. For example, the read-out label value may comprise of 7-bits and the 7-bits are inverted to determine the temporary label value. The reversible operation may comprise an XOR ('exclusive or') operation. For example, the read-out label value comprising of 7-bits may be processed using an XOR operation with a 7-bit mask made up entirely of '1' values '1111111' to invert the read-out label value by flipping all 7-bits. The setting of the write availability bit and inserting the temporary label value are both performed in a single atomic operation such that both will be seen by other threads carrying out other processes to have happened instantaneously. An advantage is that write availability is indicated in the same processing cycle as the temporary label value is inserted.

The temporary label value is converted to the read-out label value using a predetermined operation. The predetermined operation is used to retrieve the read-out label value from the temporary label value. The predetermined operation may be the inverse of the reversable operation. For example, if the read-out label value is inverted to determine the temporary label value, the predetermined operation comprises reinverting the temporary label value to determine the read-out label value. The inverse of the reversable operation may also comprise a XOR operation. For example, the temporary label value comprising of 7-bits may be processed using a XOR operation with a mask comprising of 7-bits made up entirely of '1' values '1111111' to invert the temporary label value by flipping all 7-bits, retrieving the read-out label value. The predetermined operation may be an atomic operation such that the thread performing the predetermined operation will be seen by other threads carrying out other processes to have happened instantaneously.

The read-out label value is used to identify a key data storage location on the basis of the key. For example, the read-out label value may be stored in one of the plurality of control data storage locations. The key data (representing a key) used to determine the hash value (and therefore the read-out label value) would also be stored in the key data storage location corresponding to the control data storage location in which the read-out label value was stored. The read-out label value can then be used to retrieve the key data stored within a key data storage location as the read-out label value will correspond to that particular key data. The hash table data structure may comprise a plurality of read-out label values stored within the plurality of control data storage locations. Each of the plurality of read-out label values corresponds to key data which is stored in a key data storage location. The key data storage location corresponds to the control data storage location where the respective read-out label value is stored.

During the retrieval of the key data from the hash table data structure, a key is received by the computer system. The key is used to determine a new read-out label value. The new read-out label value is compared to at least part of the plurality of read-out label values stored within control data storage locations. When the new read-out label value is determined to match the read-out label value stored within the control data storage location, the key data can be retrieved from the corresponding key data storage location. Storing the temporary label value in the place of the read-out label value in the control data storage location would therefore prevent the retrieval of the key data from the corresponding key data storage location as the new read-out label and temporary label value would not match, as the temporary label value has at least one bit which is different to that of the read-out label value.

At block 104, a control data storage location having the first write-availability state is selected. The write-availability of at least a selection of the plurality of control data storage locations is checked to determine if the control data storage location is available to be written to. In one example, each of the plurality of control data storage locations stores a 1-bit flag to indicate the write-availability state of the control data storage location. The flags of at least a selection of the plurality of control data storage locations may be checked simultaneously using instructions such as Advanced Vector Extensions (AVX) instructions. The check is used to select a control data storage location which is available to be written to. If a plurality of control data storage locations are available to be written to, the control data storage location may be selected based upon its associated memory address. If all of the control data storage locations within the selection of the plurality of control data storage locations being checked are not available to be written to then a different selection of the plurality of control data storage locations may be checked until a control data storage location which is available to be written to is found and selected.

In one example, the hash table data structure is a Swiss table comprising a plurality of buckets where each bucket comprises a plurality of control data storage locations and a corresponding plurality of data storage locations. One of the plurality of buckets may be selected using the hash value determined from the key data and hash function. The plurality of control data storage locations and corresponding key data storage locations within the selected bucket may be checked to determine a control data storage location with a write-availability indicating that it is available to be written to. If the plurality of control data storage locations and corresponding key data storage locations within the selected bucket all have a write-availability which indicates that they are not available to be written to, a different bucket may be selected and the check repeated.

At block 105, the temporary label value is stored in the selected control data storage location. Storing the temporary label value in the selected control data storage location renders both the selected control data storage location and corresponding key data storage location inactive for read-out. As previously discussed, the temporary label value stored in a control data storage location will not match with a new read-out label value, preventing the retrieval of key data from the corresponding key data storage location. The write-availability of the control data storage location is changed to the second write-availability state in association with the storage of the temporary label value in the selected control data storage location. In one example, the write-availability of the control data storage location is determined by a stored 1-bit flag. The 1-bit flag value is changed from '0' (zero) to '1' (one) to indicate that the write-availability of the control data storage location is in the second write-availability state i.e. not available to be written to.

At block 106, the key data is written to the key data storage location which corresponds to the selected control data storage location. It may take a large number of clock cycles of the computer systems processer for the key data to be fully written to the key data storage location.

At block 107 the read-out label value is retrieved by performing a predetermined operation on the temporary label value stored in the selected control data storage location. This method step occurs once the key data is fully written to the corresponding key data storage location. The temporary label value may be retrieved from the control data storage location for processing. As discussed previously, the predetermined operation may be a reinversion of the temporary label value to retrieve the read-out label value.

At block 108 the temporary label value stored in the selected control data storage location is overwritten with the retrieved read-out label value. Overwriting the temporary label value with the read-out label value may comprise retrieving the temporary label value from the control data storage location and storing the read-out label value in the control data storage location. Overwriting the temporary label value with the read-out label value may comprise writing over the temporary label value stored in the control data storage location with the read-out label value. Storing the read-out label value within the control data storage location render both the selected control data storage location and corresponding key data storage location active for read-out. As discussed previously, storing the read-out label within the control data storage location means that a matching new read-out label value can be used to retrieve key data stored in corresponding key data storage location. The process of retrieving the read-out label value and overwriting the temporary label value will be atomic such that the control data storage location and corresponding key data storage location will be rendered available for read-out instantaneously from the view of other threads carrying out other processes.

Figure 2:
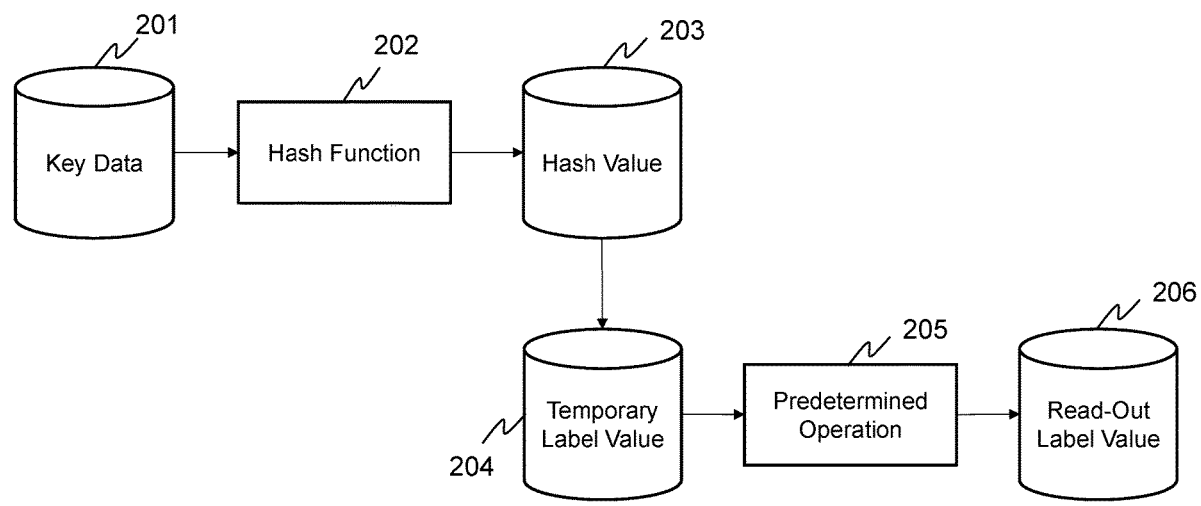
FIG. 2 shows a schematic block diagram representing a series of operations performed to process key data in accordance with the first example of the present disclosure.

FIG. 2 shows a schematic block diagram representing a series of operations performed to process key data in accordance with the first example of the present disclosure. The schematic block diagram demonstrates the order of operations used to process the key data 201 throughout the method of processing and storing key data using a hash table data structure. The computer system previously discussed in reference to FIG. 1 can be used to carry out the operations. Key data 201, representing a key, is received by the computer system. The key data 201 may comprise a key and associated data values. The key data 201 may be a key-value pair. The key data 201 is then processed using a hash function 202 to determine a hash value 203. The key contained within the key data 201 may be processed by the hash function 202 to determine the hash value 203. The hash value 203 is used to determine a temporary label value 204.

The temporary label 204 value is then temporary by a predetermined operation 205 to determine a read-out label 206.

The hash value 203 may comprise a first and second section where the second section is used to determine a read-out label value 206. The read-out label value 206 may be temporary to determine the temporary label value 204. The process used to determine the temporary label value 204 from the read-out label value 206 may be used to determine the predetermined operation 205. For example, the read-out label value 206 is inverted to determine the temporary label value 204 which means that the predetermined operation 205 will be a reinversion of the temporary label value 204.

Figure 3A:
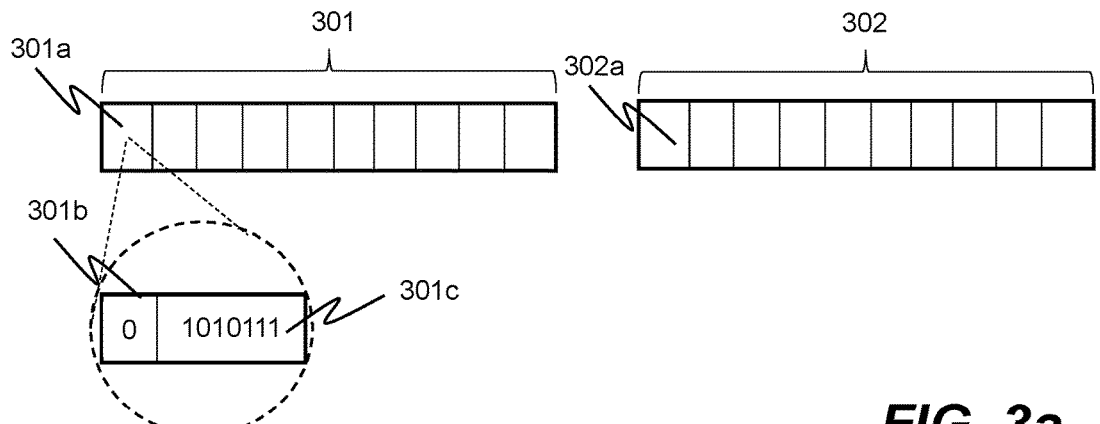
FIG. 3a shows a diagram representing a hash table data structure in accordance with a second example of the present disclosure.

FIG. 3a shows a diagram representing a hash table data structure in accordance with a second example of the present disclosure. The hash table data structure may be stored in storage circuitry of the computer system previously discussed with reference to FIG. 1 and FIG. 2. The diagram shows the plurality of control data storage locations 301 and corresponding plurality of key data storage locations 302 within the hash table data structure, consistent with an example structure of a Swiss table. Each of the plurality of control data storage locations 301 is configured to store 8-bits comprising a 1-bit flag and a 7-bit label value. The plurality of control data storage locations are therefore configured to store 16 label values. In one example, the hash table comprises of a plurality of buckets, with each bucket comprising 16 control data storage locations and 16 corresponding key data storage locations. The key data storage locations may each comprise a larger storage capacity than each of the plurality of control data storage locations. The control data storage location 301a stores the 1-bit flag 301b. The 1-bit flag 301b is used to indicate the write-availability of the control data storage location 301a in which it is stored. The 1-bit flag 301b has a value of '0' indicating that the write-availability of the control data storage location 301a is in the second write-availability state i.e. the control data storage location is not available to be written to. The control data storage location 301a also stores a read-out label value 301c. If the control data storage location is not available to be written to, this may be because a read-out label value is already stored in the control data storage location indicating that the corresponding key data storage location stores key data. The read-out label value 301c '1010111' which comprises of 7 bits and can be used to retrieve the stored key data in the corresponding key data storage location 302a.

Figure 3B:
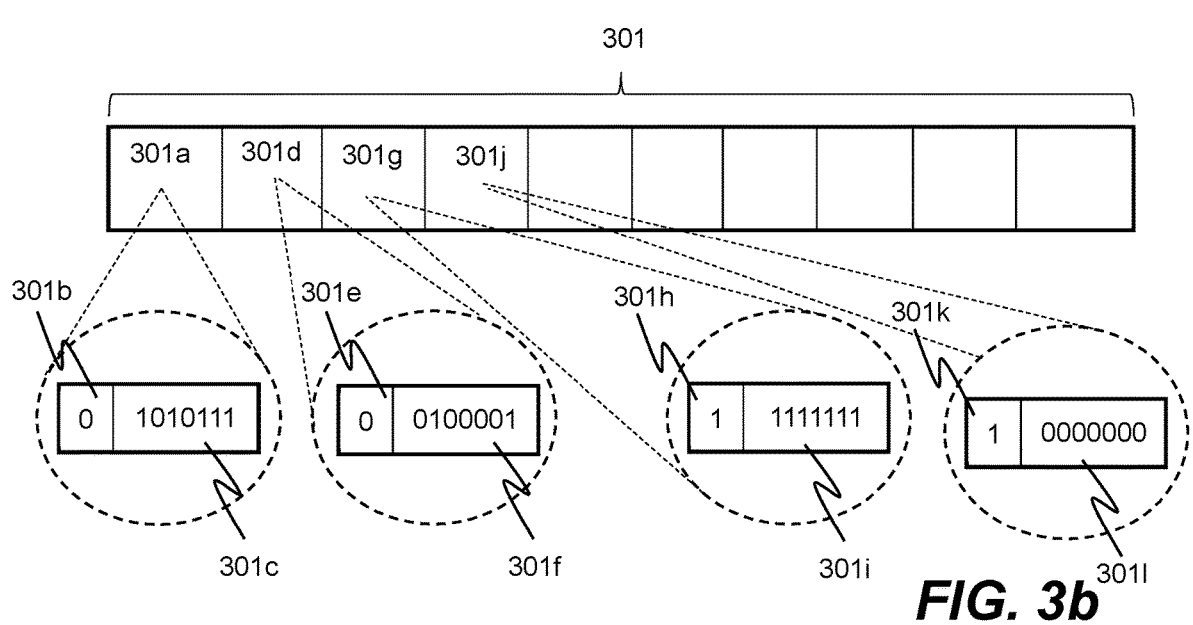
FIG. 3b shows a diagram representing selecting a control data storage location of the hash table data structure of FIG. 3a in accordance with the second example of the present disclosure.

FIG. 3b shows a diagram representing selecting a control data storage location of the hash table data structure of FIG. 3a in accordance with the second example of the present disclosure. As discussed previously, in order to store key data within the hash table data structure, a control data storage location within the plurality of control data storage locations 301 is selected. The control data storage location is selected on the basis of its write-availability being in the first state i.e. it is available to be written to. This is determined using the 1-bit flag stored in each of the plurality of control data storage locations. A check of the 1-bit flag stored in each of the plurality of control data storage locations may be carried out simultaneously using AVX instructions. The control data storage location 301a and control data storage location 301d each have a 1-bit flag value of '0' indicating that they are in the second write-availability state i.e. they are not available to be written to. The control data storage location 301a and control data storage location 301d store read-out label value 301c '1010111' and read-out label value 301c '0100001'. During the check of the 1-bit flag stored in each of the plurality of control data storage locations, control data storage location 301c and control data storage location 301d would not be selected.

The control data storage location 301g and control data storage location 301j each have a 1-bit flag value of '1' indicating that they are in the first write-availability state i.e. they are available to be written to. The control data storage location 301g stores a default 7-bit value '1111111'. This 7-bit value may indicate that the control data storage location has not stored a read-out label value since the initialisation of the hash table data structure. The control data storage location 301j stores a 7-bit value '0000000'. This 7-bit value may indicate that the control data storage location has previously stored a read-out label value, but the read-out label value has since been deleted. During the check of the 1-bit flag stored in each of the plurality of control data storage locations, control data storage location 301c and control data storage location 301d would be determined to be candidates to be selected. To further determine whether to select the control data storage location 301g or control data storage location 301j a memory address associated with each of the control data storage locations may also be checked. For example, control data storage location 301g may be selected as its associated memory address is before control data storage location 301j as indicated by the diagram.

Figure 3C:
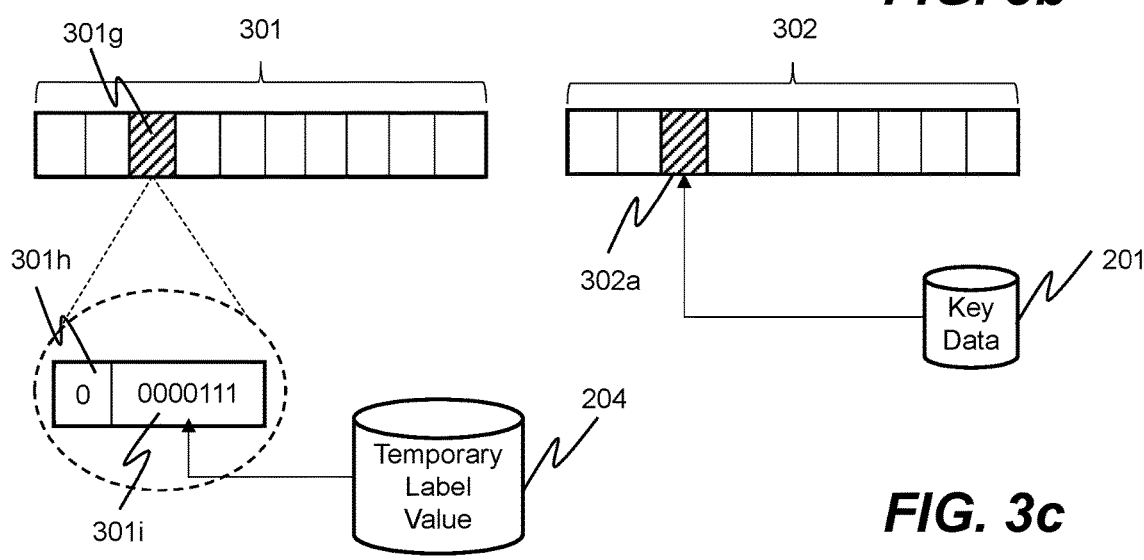
FIG. 3c shows a diagram representing storing a temporary label value in the selected control data storage location and writing key data to the corresponding key data storage location of the hash table data structure of FIG. 3a in accordance with the second example of the present disclosure.

FIG. 3c shows a diagram representing storing a temporary label value in the selected control data storage location and writing key data to a key data storage location of the hash table data structure of FIG. 3a in accordance with the second example of the present disclosure. Once control data storage location 301g is selected, as indicated by the diagram from the use of shading, a temporary label value 204 is stored in control data storage location 301g. The temporary label value 204 will be determined using a hash value. The hash value is determined using a hash function and the key data 201 which is currently in the process of being stored in the hash table data structure. In the present example, the hash value is used to determine a read-out label value where the read-out label value is temporary to determine the temporary label value 204. The temporary label value 204 is determined by using a reversible operation on the read-out label value. The reversable operation is an inversion of the read-out label value. The predetermined operation to retrieve the read-out label value from the temporary label value 204 is therefore a reinversion of the temporary label value 204.

The control data storage location 301g stores the temporary label value 204 '0000111'. The write-availability of the control data storage location 301g is changed to the second write-availability state by changing the value of the 1-bit flag 301h stored in control data storage location 301g from '1' to '0'. This indicates control data storage location 301g and the corresponding key data storage location 302a are not available to be written to. The key data 201 is written to the key data storage location 302a corresponding to the selected control data storage location 301g as indicated by the diagram. As previously discussed, writing the key data 201 to the key data storage location 302a may take a large number of clock cycles of the computer system's processor.

Storing the temporary label value 204 in the control data storage location 301g corresponding to the key data storage location 302a prevents the retrieval of the key data while it is being written to the key data storage location. This is because a key received by the computer system storing the hash table data structure which can be used to retrieve the key data 201 will generate a read-out label value which will not match the temporary label value 204, preventing access to the key data 201 while it is written. The readout label value may be generated from a hash value determined by processing the key using the hash function.

Figure 3D:
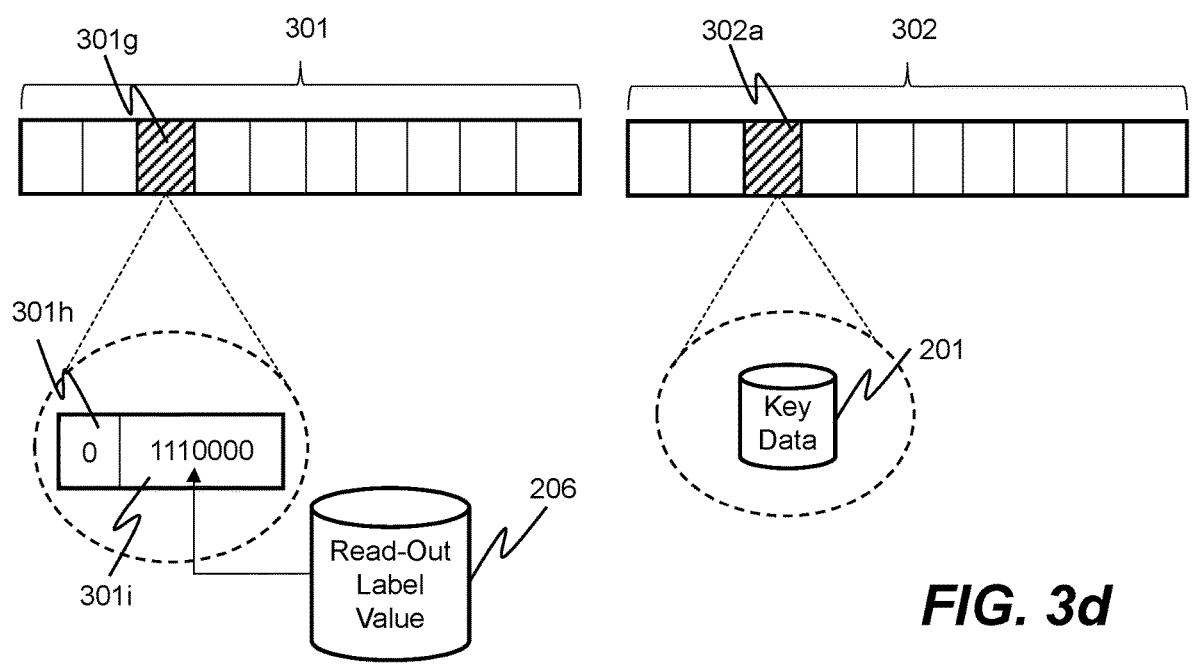
FIG. 3d shows a diagram representing overwriting the temporary label value in the selected control data storage location with a read-out label value in accordance with the second example of the present disclosure.

FIG. 3d shows a diagram representing overwriting the temporary label value in the selected control data storage location with a read-out label value in accordance with the second example of the present disclosure. Once the key data 201 has been fully written to the key data storage location 302a corresponding to the selected control data storage location 301g the temporary label value 204 is used to retrieve the read-out label value 206 using a predetermined operation. As discussed previously, the temporary label value 204 '0000111' was determined by inverting the read-out label value 206 '1110000'. The predetermined operation therefore comprises reinverting the temporary label value 204 '0000111' to determine the read-out label value 206 '1110000'. This may be achieved using a XOR operation with a 7-bit mask comprising entirely of 1 values '1111111'.

The temporary label value 204 stored in the selected control data storage location is overwritten by the retrieved read-out label value 206. This results in the retrieved read-out label value 206 '1110000' being stored in the selected control data storage location 301g. This renders both the selected control data storage location 301g and corresponding key data storage location 302a active for read-out. As discussed previously, the read-out value being stored in the selected control data storage location 301g allows for the key data stored in the corresponding key data storage location to be retrieved. The key data 201 can be retrieved using a key which matches the key contained within the key data 201. The key is processed using a hash function to determine a hash value which is further used to determine a read-out label value. This read-out label value can be compared with the read-out label value contained within the control data storage location. If the read-out label values match then the key data value is retrieved from the corresponding key data storage location.

In one example, the key received by the computer system to retrieve the stored key data is also compared to the key contained within the stored key data to determine if they match as a further authentication step in the retrieval of the key data. If they do not match, then the key data cannot be retrieved. This prevents the key data from being accessed in the situation that a read-out label value for a different key to the key stored in the key data storage location matches the temporary label value stored in the corresponding control data storage location by coincidence.

It should be noted that the number of control data storage locations and key data storage locations depicted in FIG. 3a, 3b, 3b, 3d are a subset of the plurality of control data storage locations and the plurality of key data storage locations contained within the hash table data structure.

Figure 4:
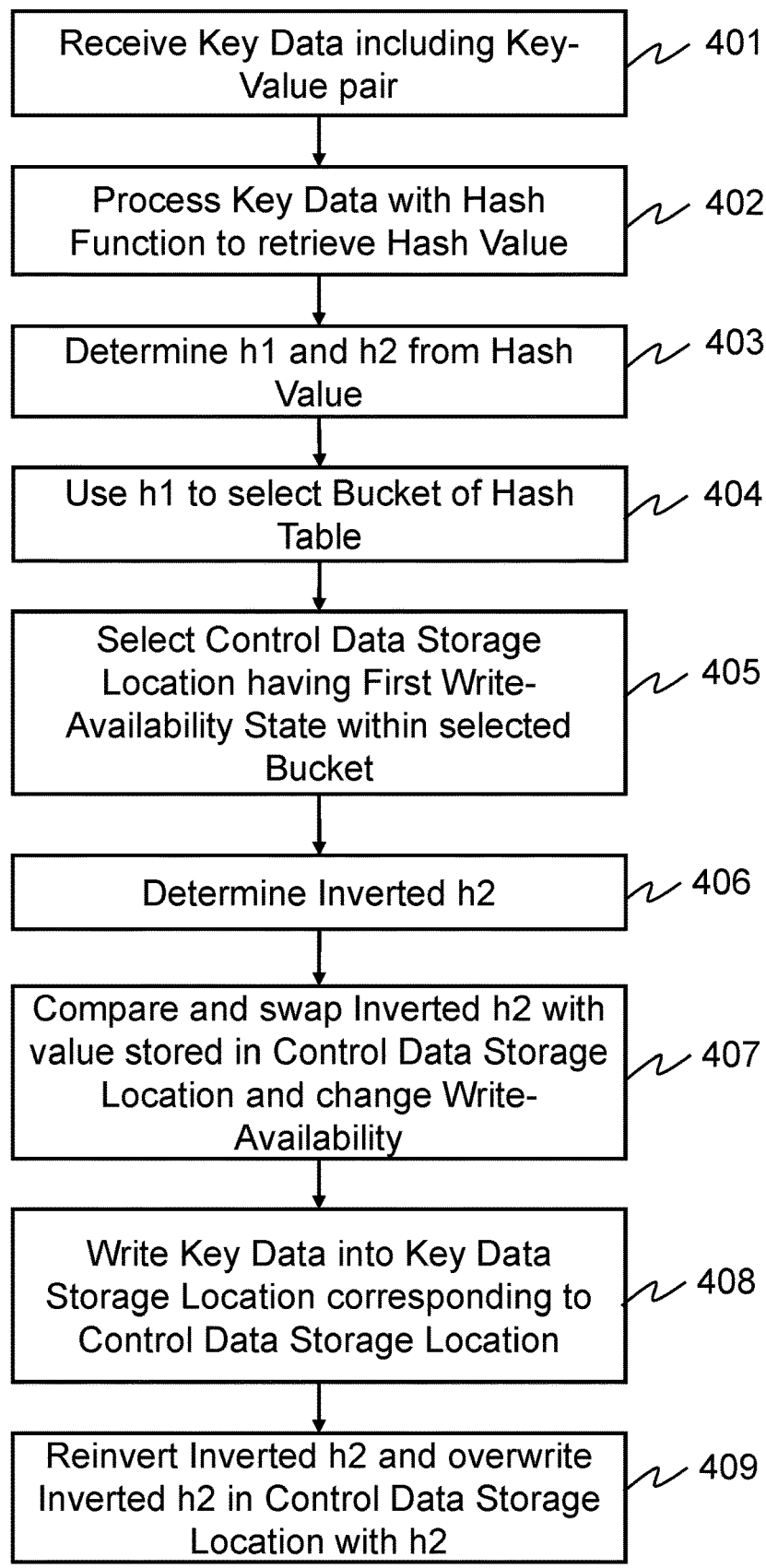
FIG. 4 shows a flow diagram representing a method of processing and storing key data in accordance with a third example of the present disclosure.

FIG. 4 shows a flow diagram representing a method of processing and storing key data in accordance with a third example of the present disclosure. The method may be carried out using the computer system previously discussed with reference to FIG. 1, FIG. 2 and FIG. 3. In the present example, the hash table data structure is a Swiss table and comprises of a plurality of buckets. Each of the plurality of buckets comprises a plurality of control data storage locations and corresponding plurality of key data storage locations.

At block 401 the computer system receives key data. The key data comprises a key-value pair. The computer system may comprise a receiver which is configured to receive data packets which have been transmitted by a transceiver over a cellular network. In one example, the hash table data structure stores data which can be used to process a received data packet based on the data contained within the received data packet. Processing the received data packet may comprise performing actions on the data packet based on key data retrieved from the hash table data structure. For example, a data packet comprising an internet protocol (IP) address may be used to retrieve a media access control (MAC) address from the hash table data structure, based on the IP address. The retrieved MAC address may then be used to send the data packet.

A received data packet may comprise header data and a payload wherein the header data forms at least part of the key data. A key-value pair may be used to process a received data packet by retrieving data to control one or more operations to be performed on the received data packet, for example packet processing operations and/or packet routing operations, from the hash table data structure. A key-value pair may, in some examples, comprise a MAC address to be stored in the hash table data structure.

At block 402, the key data is processed with a hash function to retrieve a hash value. The key contained within the key-value pair is processed by the hash function to retrieve the hash value. The hash value comprises a first section which is used to select a bucket of the plurality of buckets contained within the hash table data structure. The selected bucket comprises a plurality of control data storage locations and a corresponding plurality of key data storage locations. The hash value also comprises a second section which is used to determine a temporary label value.

The hash value comprises 64 bits. The first 57 bits of the hash value, hereafter referred to as h1, provides data which can be used to select a bucket from the plurality of buckets. The final 7 bits of the hash value, hereafter referred to as h2, provides data which can be used to determine a read-out label value and a temporary label value. Each of the plurality of control data storage locations stored within the plurality of buckets are configured to store 8-bits. Each of the plurality of control data storage locations store a 1-bit flag as the most significant bit. The remaining 7-bits of each of the plurality of control data storage locations can be used to store a read-out label value or temporary label value. When a bucket is fully populated, each of the plurality of control data storage locations will store a unique read-out label value. Each bucket of the plurality of buckets comprises 16 control data storage locations and 16 corresponding key data storage locations. The 16 key data storage locations will be configured to store a larger number of bits than the control data storage locations. The hash function may be configured to produce hash values that spread the storage of key data throughout the hash table data structure.

At block 403, h1 and h2 are determined from the hash value. This may be achieved by reading the first 57-bits of the hash value to determine h1. The last 7-bits of the hash value may be read to determine h2.

At block 404, h1 is used to select a bucket from the plurality of buckets within the hash table data structure to store the received key data. For example, each of the plurality of buckets may have an associated memory address. The memory address of the selected bucket may be provided by h1. In another example, each of the plurality of buckets has a bucket value which can be represented by 57 bits. The 57 bits of h1 provide the bucket value of the selected bucket.

At block 405, a control data storage location having the first write-availability state is selected from the plurality of control data storage locations contained within the selected bucket. Each of the plurality of control data storage locations contained within the selected bucket stores a 1-bit flag which can be used to identify the write-availability of the respective control data storage location and in turn the write-availability of the corresponding key data storage location. The write-availability of the plurality of control data storage locations can be determined by checking each of the control data storage locations associated 1-bit flags. If the value of the 1-bit flag is '0' then the control data storage location is in the second write-availability state and is not available to be written to. If the value of the 1-bit flag is '1' then the control data storage location is in the first write-availability state and is available to be written to. Having the value of the 1-bit flag as '0' to indicate that the control data storage location is in the second write-availability state and is not available to be written to, allows for the entire 8-bits of the control data storage location to be read to determine the label value being stored in the control data storage location. The 1-bit flag of each of the plurality of control data storage locations can be simultaneously checked using AVX instructions. If a plurality of control data storage locations have the first write-availability state then only one will be selected. In this scenario, the control data storage locations may be selected using an associated memory address. In one example, the control data storage location with the earliest occurring memory address may be selected.

If all of the control data storage locations contained within the plurality of control data storage locations are determined to have the second write-availability state i.e. not available to be written to, a different bucket containing a plurality of control data storage locations is selected. In one example, the plurality of buckets within the hash table data structure have bucket values. The next bucket value along from the currently selected bucket is selected in the event that each of the control data storage locations within the currently selected bucket stores a 1-bit flag indicating the second write-availability state. In a further example, the plurality of buckets within the hash table data structure have associated memory addresses. The bucket with the next memory address along from the currently selected bucket is selected in the event that each of the control data storage locations within the currently selected bucket stores a 1-bit flag indicating the second write-availability state. Different buckets are selected until a control data storage location having the first write-availability state is found and selected.

At block 406, a temporary label value in the form of inverted h2 is determined. As previously discussed, the read-out label value is determined using the final 7-bits of the hash value. The temporary label value is determined from the read-out label value. In the present example, h2 is inverted to determine the temporary label value. Therefore, the predetermined operation which can be used to process to the temporary label value to retrieve the read-out label value is reinverting the temporary label value. Inverting h2 may be achieved by flipping all bits contained within. In another example, only part of h2 may be inverted to determine the temporary label value, with the same part of h2 being reinverted to determine the read-out label value.

At block 407, inverted h2 is stored in the selected control data storage location by using a compare and swap (CAS) instruction to perform a CAS operation. The CAS operation is an atomic operation which is used to advantage in a multi-threading example to ensure that in the time between selecting the control data storage location and before storing inverted h2 in the selected control data storage location, another value hasn't been stored by another thread in the selected control data storage location. The CAS operation compares the contents of the selected control data storage location with the value stored in the control data storage location when it was first selected and only if they are the same, stores the inverted h2 in the control data storage location. If the value stored in the control data storage location when it was first selected and the value of the contents just before storing inverted h2 do not match then the CAS operation fails and the inverted h2 is not stored in the selected control data storage location. A different control data storage location may then be selected by repeating the step of block 405.

When inverted h2 is stored in the selected control data storage location the write-availability of the selected control data storage location is changed from the first write-availability state to the second write-availability state i.e. not available to be written to. This is achieved by updating the 1-bit flag associated with the selected control data storage location from a value of '1' to '0'. The 1-bit flag value may be changed at the same time as the inverted h2 is stored.

Storing the inverted h2 in the selected control data storage location and changing the write-availability of the control data storage location to the second write-availability state are carried out in examples using a single atomic operation, which in this example is a CAS operation performed using a CAS instruction. The CAS instruction also ensures a check whether the data has changed in the time between reading data and writing back data. This happens atomically with the write itself.

As previously discussed, storing temporary label value in the selected control data storage location prevents the corresponding key data storage location from being retrieved before the key data is fully written to it. A key which can be used to retrieve the key data would produce a read-out label value (h2) which would not match the temporary label value (inverted h2), thus preventing the key data from being retrieved.

At block 408, the key data is written into the key data storage location corresponding to the selected control data storage location. As previously discussed, it may take a number of clock cycles of the processor for the key data to be fully written to the key data storage location. The inverted h2 stored in the corresponding control data storage location would prevent the retrieval of the partly written key data from the key data storage location.

At block 409, the inverted h2 stored in the control data storage location is overwritten with h2 to render both the selected control data storage location and corresponding key data storage location active for read-out. To overwrite the inverted h2, the inverted h2 may be retrieved from the control data storage location and processed with the predetermined operation. In this example, the predetermined operation is a reinversion of the inverted h2 (temporary label value) to determine h2 (read-out label value). Once h2 is retrieved it is stored in the control data storage location. This renders the selected control data storage location and corresponding key data storage location active for read-out allowing for the retrieval of the key data stored in the key data storage location. A key retrieved by the computer system to access the key data stored in the key data storage location, through being processed by a hash function to determine the hash value, would produce a read-out label value matching the h2 stored in the control data storage location allowing for the key data to be retrieved.

Figure 5:
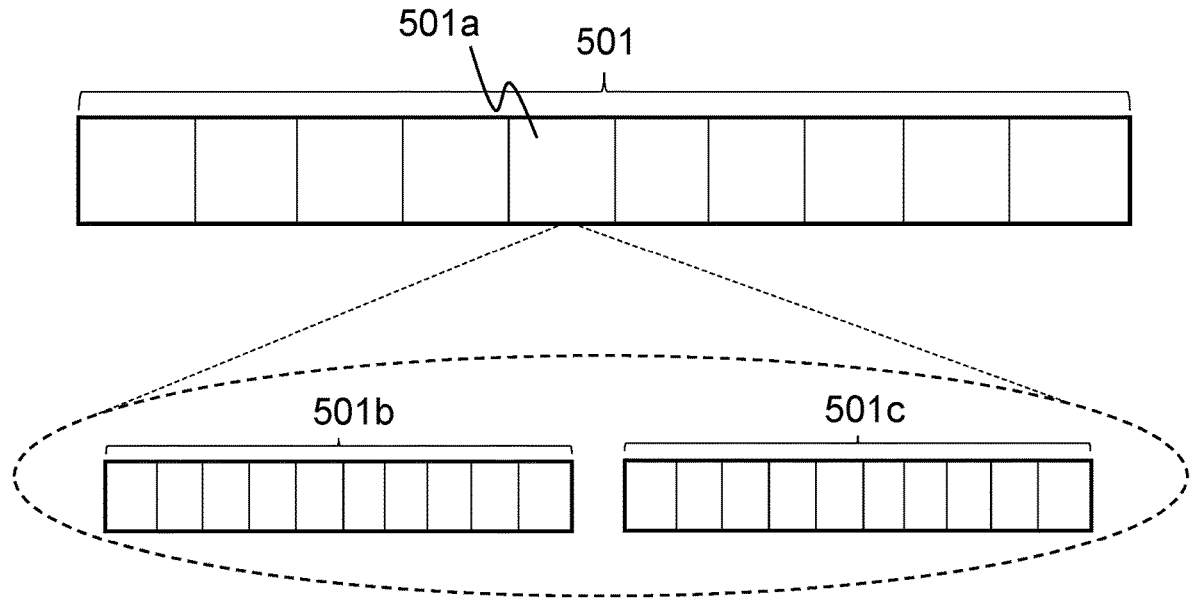
FIG. 5 shows a diagram representing a hash table data structure in accordance with the third example of the present disclosure.

FIG. 5 shows a diagram representing a hash table data structure in accordance with the third example of the present disclosure. The hash table data structure is a Swiss table. The hash table data structure may be stored in the storage circuitry of the computer system referenced in previous discussions. The hash table data structure comprises a plurality of buckets 501. Each bucket of the plurality of buckets, such as bucket 501a, comprises a plurality of control data storage locations 501b and a corresponding plurality of key data storage locations 501c. Note that the diagram represents only a subset of the buckets, control data storage locations and key data storage locations within the hash table data structure.

Figure 6:
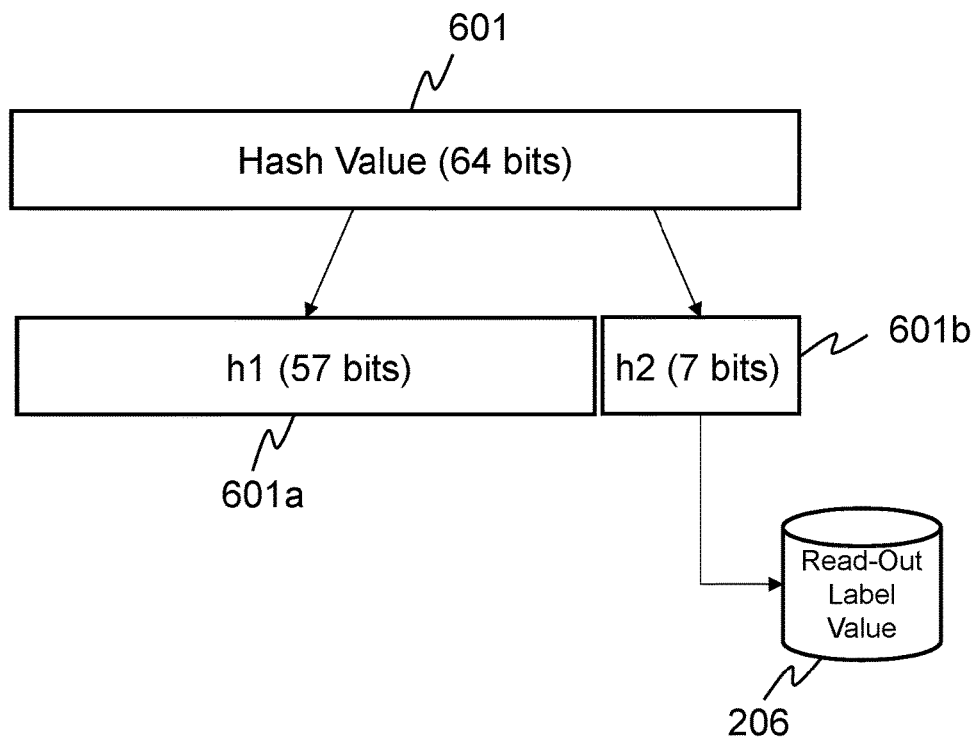
FIG. 6 shows a diagram representing the hash value comprising a first section and a second section in accordance with the third example of the present disclosure.

FIG. 6 shows a diagram representing the hash value comprising a first section and a second section in accordance with the third example of the present disclosure. The hash value 601 is generated from at least part of the key data received by the computer system. The hash value 601 may be generated by a key within the received key data which is temporary by a hash function. The hash value 601 comprises 64 bits. The hash value 601 comprises a first section h1 601a of 57-bits and a second section h2 601b of 7-bits. The first section h1 601a is used to select a bucket of the plurality of buckets within the hash table data structure. The second section h2 601b is used to determine a read-out label value 206. The read-out label value 206 is retrieved by reading h2. The read-out label value 206 is further used to determine a temporary label value. For example, h2 may be inverted to determine the temporary label value.

Figure 7:
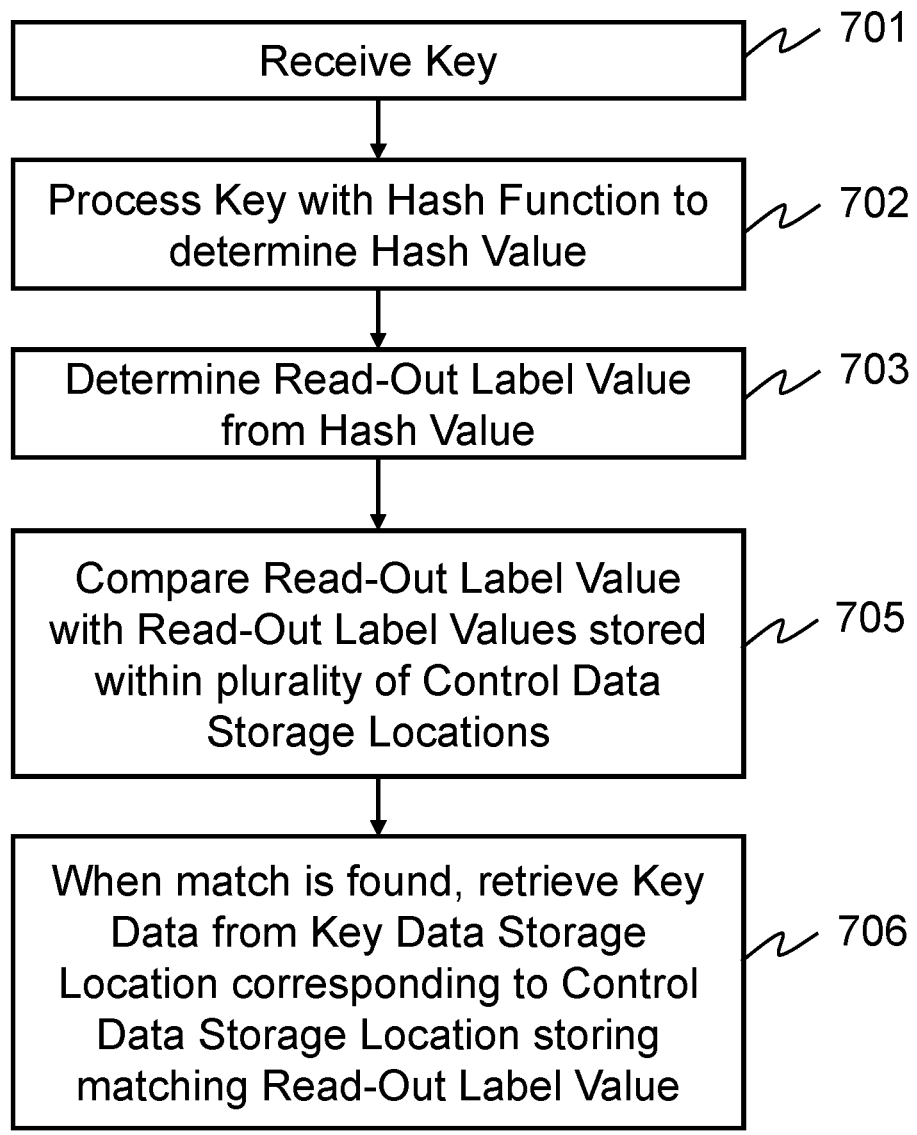
FIG. 7 shows a flow diagram representing a method of retrieving key data in accordance with a fourth example of the present disclosure.

FIG. 7 shows a flow diagram representing a method of retrieving key data in accordance with a fourth example of the present disclosure. The method may be conducted using the computer system previously discussed with reference to FIG. 4. At block 701 the computer system receives a key. The received key will be used to retrieve key data from the hash table data structure. In the present example the hash table data structure is a Swiss table. The received key will match the key contained within the key data which the received key is attempting to retrieve. The computer system may comprise a receiver which is configured to receive data packets which have been transmitted by a transceiver via the use of a cellular network. In one example, the hash table data structure stores data which can be used to process the received data packet based on the data contained within the received data packet. Processing the received data packet includes performing actions on the received data packet based upon the key data retrieved from the hash table data structure.

A received data packet may comprise header data which contains the key. A received data packet may also comprise header data containing a plurality of keys where each key is used to retrieve a plurality of different key data used to process the received data packet. For example, a key may be used to retrieve a MAC address from the hash table data structure and the retrieved MAC address may be used to transmit the data packet using a transmitter.

At block 702, the received key is processed using a hash function to determine a hash value. The hash table data structure may comprise a plurality of buckets where each bucket stores a plurality of control data storage locations and corresponding key data storage locations. The determined hash value may comprise 64 bits with the first 57 bits selecting a bucket of the plurality of buckets within the hash table data structure. As the received key matches the key contained within the key data which the received key is attempting to retrieve, the 57 bits of the determined hash value will indicate which bucket the key data is stored within.

At block 703, the hash value is used to determine a read-out label value. As previously discussed, the hash value may comprise 64 bits, with the last 7 bits being read to determine the read-out label value. The hash function will be chosen such that the determined read-out label value will be unique to the received key. The key will be received to access specific key data contained within the hash data structure and will be able to do so based on the read-out label value. The determined read-out label value will match the read-out label value which was determined during the process used to store the key data which the received key is attempting to retrieve.

At block 705, the determined read-out label value is compared to read-out label values stored within a plurality of the control data storage locations of the hash table data structure. The plurality of control data storage locations contained within the selected bucket as determined by the hash value may be selected for the comparison. AVX instructions may be used to compare the determined read-out label value with the read-out label values contained within each of the plurality of control data storage locations simultaneously. As discussed previously, the value of the 1-bit flag of the control data storage location being '0' indicates that the write-availability state of the control data storage location is not available to be written to. The 1-bit flag value being '0' also allows the entire 8-bits of the control data storage location to be checked to determine if the read-out label value stored in the control data storage location matches the determined read-out label value.

The plurality of control data storage locations within the selected bucket may also be checked to determine if any of the control data storage locations are not in use. This may be determined by checking the 1-bit flag of each of the plurality of control data storage locations. If the 1-bit flag has a value of '1' this indicates that the control data storage location is not in use. If the 1-bit flag has a value of '0' this indicates that the control data storage location is in use. If at least one of the plurality of control data storage locations within the selected bucket is not in use and the determined read-out label value does not match the read-out label values stored in each of the plurality of control data storage locations, then it may be determined that the retrieval has failed.

If none of the read-out label values contained within the plurality of control data storage locations match the determined read-out label value, a different bucket may be selected for further comparison. The plurality of read-out label values contained within the plurality of control data storage locations of the next selected bucket will be used for the comparison. The next selected bucket will be determined depending on the process used to select a different bucket during the storing of key data. This occurs when a fully populated bucket is selected, and the key data cannot be stored in the currently selected bucket. It is checked whether any of the slots have never been used in the bucket that is being searched. If this is the case, then the value to retrieve cannot be in the next bucket. If there are no slots that have never been used, then the next bucket is checked.

At block 706, when a match to the determined read-out value is found, the key data is retrieved from the key data storage location corresponding to the control data storage location storing the matching read-out label value. The retrieval of the key data from the hash table data structure may be completed in such a way as to preserve the key data being stored within the hash table data structure for future retrieval. In one example, there is an extra retrieval authentication step in place where the received key is compared to the key contained within the retrieved key data. If the received key and retrieved key do not match, then the key data cannot be retrieved. This may occur when the determined read-out label value matches a temporary label value by coincidence. The extra retrieval authentication step prevents the wrong key data from being retrieved. In one example, retrieval of the key data by a key received from a data packet results in the received data packet being processed and then transmitted by a transmitter contained within the computer system.

In another example, the above process discussed with reference to FIG. 7 can also be used to remove or delete key data stored within the hash table data structure. Instead of retrieving the key data using the method above, the key data may be deleted or removed from the key data storage location. The read-out label value of the corresponding control data storage location is also deleted to render the control data storage location unavailable for read-out. The read-out label value of the corresponding control data storage location may be deleted by replacing it with the value '0000000'. The associated 1-bit flag value stored within the control data storage location may also be changed to indicate that the control data storage location and corresponding key data storage location have a write-availability which is available to be written to.

Although the hash table data structures discussed in the various examples throughout this disclosure are consistent with the structure of a Swiss table, it will be appreciated that the features of the discussed examples are also compatible with other hash table data structure types such as Facebook's open-source F14 hash tables, string adaptive hash tables, khash hash tables as well as other well-known hash table data structures.

Figure 8:
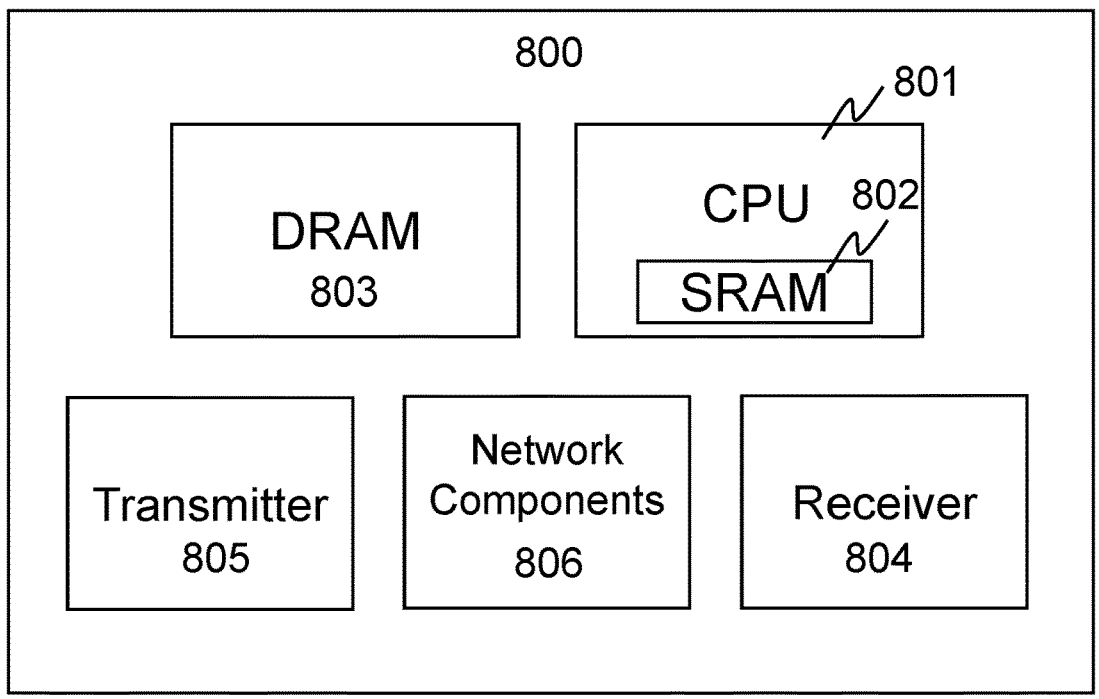
FIG. 8 shows a schematic diagram for a computer system in accordance with examples of the present disclosure.

It will also be noted that features of the discussed examples are also compatible with hash table data structures that utilise chaining. Chaining occurs when it is determined that new key data is to be stored at a location of the hash table data structure already storing previously stored key data. Instead of searching for the next available location to store the new key data, a pointer may be stored in the same locations as the previously stored key data. The pointer points to the new key data which is stored elsewhere in the storage circuitry which stores the hash table data structure. The pointer can then be utilised to retrieve the new key data during the retrieval process. FIG. 8 shows a schematic diagram for a computer system in accordance with examples of the present disclosure. The computer system 800 is configured to carry out the methods discussed in the previous examples. The computer system 800 comprises a system bus which connects the components within the computer system 800. The computer system comprises a processor such as a CPU 801 which is configured to conduct the various operations associated with the methods previously discussed such as determining hash values, temporary label values and read-out label values. It will be appreciated that other types of processors such as a GPU may also be used. The CPU 801 may contain SRAM 802 which is used to store data for the purposes of being processed by the CPU 801. The computer system also comprises DRAM 803 which contains the hash table data structure and data contained within the hash table data structure such as the key data, read-out label values, temporary label values and 1-bit flags. Data stored in the DRAM 803 may be transferred to the SRAM 802 contained within the CPU 801 for processing. Instructions used to carry out the various methods discussed in previous examples such as storing and retrieving data from the hash table data structure can be stored in the storage circuitry of the computer system 800 such as the DRAM 803 or SRAM 802.

The computer system 800 also comprise a receiver 804 and transmitter 805 to receive and transmit data packets respectively. The computer system 800 also comprises network components 806 such as a network interface card (NIC) which allow the computer system to connect to a network such as a computer or cellular network.

Figure 9:
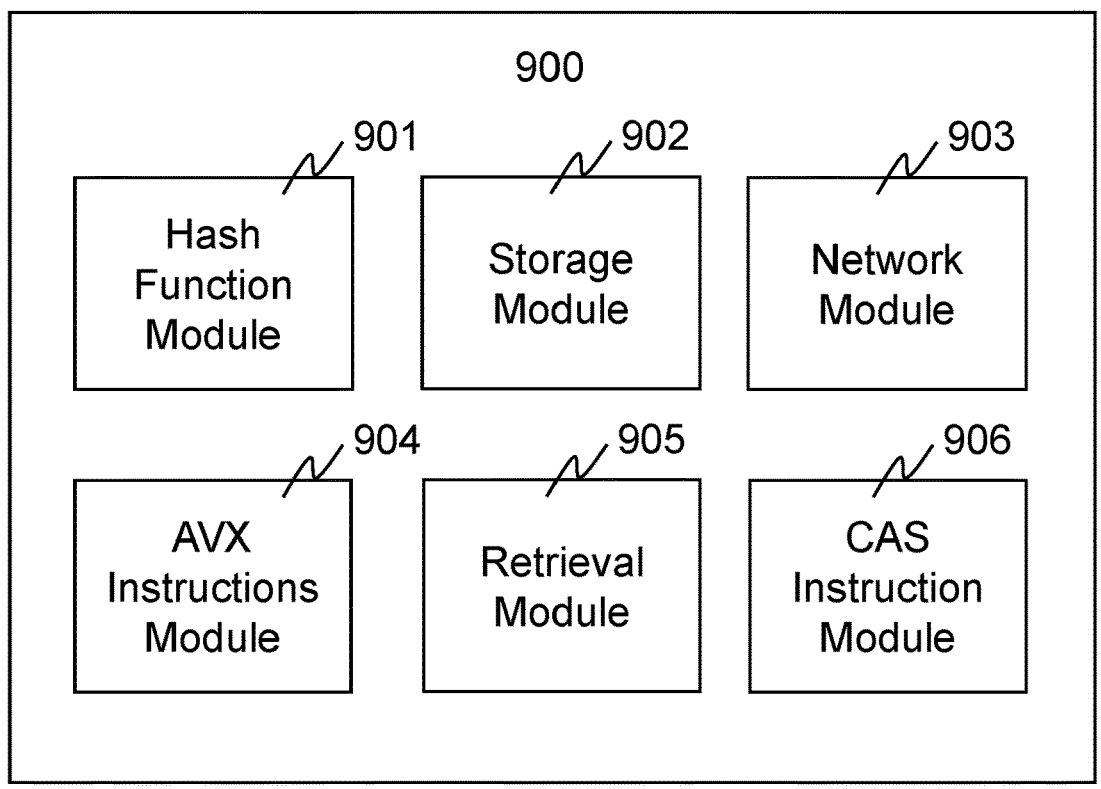
FIG. 9 shows a schematic diagram representing a computer program product in accordance with examples of the present disclosure.

FIG. 9 shows a schematic diagram representing a computer program product in accordance with examples of the present disclosure. The computer program product 900 comprises modules which contain instructions which when executed by a processor carry out the various methods discussed in previous examples. The instructions contained within the computer program product can be executed using a computer system comprising a processor such as a CPU. The computer system also comprises storage circuitry to store a hash table data structure and the computer program product. The computer program product 900 comprises a hash function module 901, storage module 902, network module 903, AVX instructions module 904, retrieval module 905 and CAS instruction module 906. The hash function module 901 comprises instructions and associated hash functions which when executed process received key data to determine hash values. The hash function module 901 may comprise a plurality of hash functions where different hash functions can be selected depending on the use case of the hash data table structure contained within the storage circuitry of the computer system. The storage module 902 comprises instructions which when executed store key data in the hash table data structure. The network module 903 comprises instructions which when executed allow the computer system to connect to a network such as a computer or cellular network as well as instructions which when executed transmit and receive data packets via the cellular network. The AVX instructions module 904 comprises AVX instructions which when executed carry out simultaneous operations such as simultaneous determination of 1-bit flag values. The retrieval module 905 comprises instructions which when executed retrieve key data from the hash table data structure. The CAS instruction module 906 comprises instructions which when executed carry out a CAS process. The CAS process can be used to store data in the hash table data structure.

The above examples are to be understood as illustrative examples of the invention. Further examples of the invention are envisaged.

Whilst in the above examples a temporary label value is obtained from the hash value, in alternatives, a temporary label value may be obtained using a predetermined value which is reserved to indicate that the selected control data storage location and a corresponding key data storage location are inactive for read-out. This reserved value would not be used as a read-out label value. The advantage of using a reserved temporary label value would be reduced amount of processing required to obtain the temporary label value, compared to obtaining it from the hash value, and reduced processing required to identify that the selected control data storage location and a corresponding key data storage location are inactive for read-out.

On the other hand, an advantage of examples in which a temporary label value is obtained from the hash value is that a higher number of different read-out label values may be used thus decreasing the chance of collision.

Whilst in the above examples, in which a temporary label value is obtained from the hash value and the read-out label value is obtained by performing a predetermined operation on the temporary label value, the read-out label value may alternatively be obtained by storing the read-out label value in memory whilst the selected control data storage location and a corresponding key data storage location are inactive for read-out. The read-out label value may be retrieved from memory when the temporary label value stored in the selected control data storage location is to be over-written.

The above examples demonstrate a number of technical advantages. The disclosed methods, apparatuses and computer programs provide solutions for utilising multi-threaded programming with hash tables whilst preventing the reading of partly written data stored in locations within the hash table which exist during the writing process. The reading of partly written data may lead to the retrieval of erroneous data. Preventing the reading of partly written data therefore prevents the retrieval of erroneous data.

The above examples circumvent technical issues which result from using traditional locking mechanisms to prevent the reading of partly written data. Traditional locking mechanisms have a significant impact on performance where hash tables are used for computationally intensive purposes. The generation of a plurality of locks increases memory occupancy. Reducing the number of locks to decrease the memory occupancy reduces the granularity of which locations can be locked. The disclosed methods, apparatuses and computer programs demonstrate a solution for preventing the read-out of partly written data involving the use of a read-out label value and processed label value which is determined from a hash value, preventing the need to generate new data for the purposes of preventing read-out and reducing memory occupancy.

The above examples may be used in combination with elements of a packet processing pipeline. The packet processing pipeline may utilise multi-threading in combination with a hash table data structure to receive, store data, retrieve data, process and transmit data packets.

Certain examples demonstrate methods, apparatuses, and computer programs for using a hash value to select a bucket to store key data, where the hash table data structure comprises of a plurality of buckets. Each of the plurality of buckets comprises a plurality of control data storage locations and corresponding key data storage locations. The hash value is determined using key data and a hash function. The hash function may be selected to tune the distribution of the key data stored within the buckets of the hash table data structure. The distribution of stored key data within the buckets of the hash table may be tuned to ensure that storing a plurality of key data in the same bucket is avoided. Having a large amount of key data stored in the same bucket increases the likelihood that key data being retrieved is not stored in the bucket indicated by the hash value. Further processing would then be used to find the key data. Avoiding a plurality of key data being stored in the same bucket prevents this further processing step, increasing the efficiency of the retrieval process.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The disclosure presented herein also encompasses the subject matter set forth in the following clauses:

Clause 1. A method of processing key data, which represents a key, using a hash table data structure, wherein the hash table data structure comprises a plurality of control data storage locations corresponding to a plurality of key data storage locations, wherein each of the plurality of control data storage locations has a write-availability indicated by a first write-availability state, which indicates that the control data storage location is available to be written to, and a second write-availability state, which indicates that the control data storage location is not available to be written to, the method comprising:
receiving the key data;
applying a hash function to at least part of the key data to determine a hash value;
obtaining a temporary label value, wherein the temporary label value has at least one bit which is different to that of a read-out label value which is to be used to identify a key data storage location on the basis of the key;
selecting a control data storage location having the first write-availability state;
storing the temporary label value in the selected control data storage location to render both the selected control data storage location and a corresponding key data storage location inactive for read-out, wherein the write-availability of the control data storage location is changed to the second write-availability state in association with the storage of the temporary label value in the selected control data storage location;
writing the key data to the key data storage location which corresponds to the selected control data storage location;
obtaining the read-out label value; and
overwriting the temporary label value stored in the selected control data storage location with the obtained read-out label value, to render both the selected control data storage location and corresponding key data storage location active for read-out.

Clause 2. A method according to clause 1, wherein the temporary label value is determined from the hash value.

Clause 3. A method according to clause 2, wherein the hash value comprises a first section and second section and the hash table data structure comprises a plurality of buckets, each comprising a plurality of control data storage locations and a corresponding plurality of key data storage locations, the method comprising:
using the first section of the hash value to select a bucket of the plurality of buckets in which the selected control data storage location is to be found; and
using the second section of the hash value is to determine the temporary label value.

Clause 4. A method according to clause 2 or clause 3, wherein the method comprises determining the temporary label value by:
determining the read-out label value from the hash value; and
performing a reversible operation on at least part of read-out label value.

Clause 5. A method according to clause 4, wherein the reversible operation comprises an XOR operation.

Clause 6. A method according to any preceding clause, comprising obtaining the read-out label value by performing a predetermined operation on the temporary label value.

Clause 7. A method according to clause 6, wherein the method comprises obtaining the read-out label value by performing an inverse-of-a-reversible operation on at least part of the temporary label value.

Clause 8. A method according to clause 7, wherein the inverse-of-a-reversible operation comprises an XOR operation.

Clause 9. A method according to any preceding clause, wherein storing the temporary label value in the selected control data storage location comprises a compare and swap (CAS) instruction.

Clause 10. A method according to clause 9, wherein storing the temporary label value in the selected control data storage location is performed by a first thread and one or more other threads are capable of writing to the hash table data structure whilst the temporary label value is stored in the selected control data storage location.

Clause 11. A method according to any preceding clause, wherein the key data includes a key-value pair.

Clause 12. A method according to any preceding clause, comprising:
processing a data packet using the key data.

Clause 13. A method according to any preceding clause, wherein the method further comprises:
receiving a key;
identifying a control data storage location on the basis of the received key; and
reading out key data from a key data storage location corresponding to the identified control data storage location.

Clause 14. A method according to clause 13, comprising:
retrieving data to control one or more operations to be performed on the received data packet from the hash table data structure.

Clause 15. A method according to clause 14, wherein:
the key data which has been read out from the key data storage location comprises a MAC address; and
processing the received data packet using the key data which has been read out comprises transmitting the data packet using the MAC address.

Clause 16. A method according any of clauses 13, 14 or 15, wherein the method further comprises:
comparing at least part of the key data which has been read out with the received key; and
determining whether the identified control data storage location and corresponding key data storage location are active for read-out on the basis of the comparing.

Clause 17. A computer system comprising:
memory circuitry arranged to store key data which represents a key, a hash table data structure comprising a plurality of control data storage locations corresponding to a plurality of key data storage locations, wherein each of the plurality of control data storage locations has a write-availability indicated by a first write-availability state, which indicates that the control data storage location is available to be written to, and a second write-availability state, which indicates that the control data storage location is not available to be written to, a hash function, a hash value, a temporary label value, a predetermined operation and a read-out label value; and
processing circuitry configured to:
receive the key data;
apply the hash function to at least part of the key data to determine the hash value;
obtain the temporary label value, wherein the temporary label value has at least one bit which is different to that of a read-out label value which is to be used to identify a key data storage location on the basis of the key;
select a control data storage location having the first write-availability state;
store the temporary label value in the selected control data storage location to render both the selected control data storage location and a corresponding key data storage location inactive for read-out, wherein the write-availability of the control data storage location is changed to the second write-availability state in association with the storage of the temporary label value in the selected control data storage location;
write the key data to the key data storage location which corresponds to the selected control data storage location;
obtain the read-out label value;
overwrite the temporary label value stored in the selected control data storage location with the obtained read-out label value, to render both the selected control data storage location and corresponding key data storage location active for read-out.

Clause 18. The computer system of clause 17 further comprising:
a receiver configured to receive data packets; and
a transmitter configured to transmit data packets,
wherein the processing circuitry is configured to process a data packet, after being received by the receiver and before being transmitted by the transmitter, using the key data.

Clause 19. A computer program product comprising instructions which, when executed by a computer, cause the computer to perform the method of any of clauses 1 to 16.

What is claimed:

1. A method of processing key data representative of a key using a hash table data structure, wherein the hash table data structure comprises a plurality of control data storage locations corresponding to a plurality of key data storage locations, wherein each of the plurality of control data storage locations has a write-availability indicated by a first write-availability state which indicates that the control data storage location is available to be written to, and a second write-availability state, which indicates that the control data storage location is not available to be written to, the method comprising:
receiving the key data;
applying a hash function to at least part of the key data to determine a hash value;
based on the determined hash value, determining a temporary label value, wherein the temporary label value has at least one bit which is different from a read-out label value usable to identify a key data storage location based on the key;
selecting a control data storage location of the plurality of control data storage locations having the first write-availability state;
storing the temporary label value in the selected control data storage location to render both the selected control data storage location and a corresponding key data storage location inactive for read-out, wherein the write-availability of the selected control data storage location is caused to be changed to the second write-availability state in response to the storage of the temporary label value in the selected control data storage location;

writing the key data to the key data storage location corresponding to the selected control data storage location;

performing a predetermined operation on the temporary label value stored in the selected control data storage location to determine a new read-out label value; and overwriting the temporary label value stored in the selected control data storage location with the new read-out label value to render both the selected control data storage location and corresponding key data storage location active for read-out; wherein the determination of the new read-out label value and overwriting the temporary label value are performed atomically.

2. The method according to claim 1, wherein:

the temporary label value is determined from the hash value; and the hash value comprises a first section and second section and the hash table data structure comprises a plurality of buckets, each comprising a plurality of control data storage locations and a corresponding plurality of key data storage locations, the method further comprising:

using the first section of the hash value to select a bucket of the plurality of buckets in which the selected control data storage location is to be found; and using the second section of the hash value is to determine the temporary label value.

3. The method according to claim 2, further comprising determining the temporary label value by:

determining the read-out label value from the hash value; and performing a reversible operation on at least part of read-out label value.

4. The method according to claim 3, wherein the reversible operation comprises an XOR operation.

5. The method according to claim 1, wherein the new read-out label value is determined by performing an inverse-of-a-reversible operation on at least part of the temporary label value.

6. The method according to claim 5, wherein the inverse-of-a-reversible operation comprises an XOR operation.

7. The method according to claim 1, wherein storing the temporary label value in the selected control data storage location comprises a compare and swap (CAS) instruction.

8. The method according to claim 7, wherein storing the temporary label value in the selected control data storage location is performed by a first thread and one or more other threads are capable of writing to the hash table data structure while the temporary label value is stored in the selected control data storage location.

9. The method according to claim 1, wherein the key data includes a key-value pair.

10. The method according to claim 1, further comprising: processing a data packet using the key data.

11. The method according to claim 1, further comprising:

receiving a key;

identifying a control data storage location on the basis of the received key; and reading out key data from a key data storage location corresponding to the identified control data storage location.

12. The method according to claim 11, further comprising:

retrieving data to control one or more operations to be performed on a received data packet from the hash table data structure, wherein:

the key data which has been read out from the key data storage location comprises a MAC address; and processing the received data packet using the key data which has been read out comprises transmitting the data packet using the MAC address.

13. The method according to claim 12, further comprising:

comparing at least part of the key data which has been read out with the received key; and determining whether the identified control data storage location and corresponding key data storage location are active for read-out on the basis of the comparing.

14. A computer system comprising:

one or more processors; and a memory storing:

key data which represents a key, a hash table data structure comprising a plurality of control data storage locations corresponding to a plurality of key data storage locations, wherein each of the plurality of control data storage locations has a write-availability indicated by a first write-availability state, which indicates that the control data storage location is available to be written to, and a second write-availability state, which indicates that the control data storage location is not available to be written to, a hash function, a hash value, a temporary label value, a predetermined operation, and a read-out label value;

the memory communicatively coupled with the one or more processors, the memory having computer-readable instructions stored thereupon that, when executed by the one or more processors, cause the system to perform operations comprising:

receiving the key data;

applying a hash function to at least part of the key data to determine a hash value;

based on the determined hash value, determining a temporary label value, wherein the temporary label value has at least one bit which is different from a read-out label value usable to identify a key data storage location based on the key;

selecting a control data storage location of the plurality of control data storage locations having the first write-availability state;

storing the temporary label value in the selected control data storage location to render both the selected control data storage location and a corresponding key data storage location inactive for read-out, wherein the write-availability of the selected control data storage location is caused to be changed to the second write-availability state in response to the storage of the temporary label value in the selected control data storage location;

writing the key data to the key data storage location corresponding to the selected control data storage location;

performing a predetermined operation on the temporary label value stored in the selected control data storage location to determine a new read-out label value; and overwriting the temporary label value stored in the selected control data storage location with the new read-out label value to render both the selected control data storage location and corresponding key data storage location active for read-out; wherein the determination of the new read-out label value and overwriting the temporary label value are performed atomically.

15. The computer system according to claim 14, wherein:
the temporary label value is determined from the hash value; and
the hash value comprises a first section and second section and the hash table data structure comprises a plurality of buckets, each comprising a plurality of control data storage locations and a corresponding plurality of key data storage locations, the memory further comprising computer-readable instructions stored thereupon that, when executed by the one or more processors, cause the system to perform operations comprising:
using the first section of the hash value to select a bucket of the plurality of buckets in which the selected control data storage location is to be found; and
using the second section of the hash value is to determine the temporary label value.

16. The computer system according to claim 15, the memory further comprising computer-readable instructions stored thereupon that, when executed by the one or more processors, cause the system to perform operations comprising further comprising determining the temporary label value by:
determining the read-out label value from the hash value; and
performing a reversible operation on at least part of read-out label value.

17. The computer system according to claim 16, wherein the reversible operation comprises an XOR operation.

18. The computer system according to claim 14, wherein the new read-out label value is determined by performing an inverse-of-a-reversible operation on at least part of the temporary label value.

19. The computer system according to claim 18, wherein the inverse-of-a-reversible operation comprises an XOR operation.

20. A non-transitory computer program comprising a set of instructions, which, when executed by a computer system, cause the computer system to perform operations for processing key data representative of a key using a hash table data structure, wherein the hash table data structure comprises a plurality of control data storage locations corresponding to a plurality of key data storage locations, wherein each of the plurality of control data storage locations has a write-availability indicated by a first write-availability state which indicates that the control data storage location is available to be written to, and a second write-availability state, which indicates that the control data storage location is not available to be written to, the operations comprising:
receiving the key data;
applying a hash function to at least part of the key data to determine a hash value;
based on the determined hash value, determining a temporary label value, wherein the temporary label value has at least one bit which is different from a read-out label value usable to identify a key data storage location based on the key;
selecting a control data storage location of the plurality of control data storage locations having the first write-availability state;
storing the temporary label value in the selected control data storage location to render both the selected control data storage location and a corresponding key data storage location inactive for read-out, wherein the write-availability of the selected control data storage location is caused to be changed to the second write-availability state in response to the storage of the temporary label value in the selected control data storage location;
writing the key data to the key data storage location corresponding to the selected control data storage location;
performing a predetermined operation on the temporary label value stored in the selected control data storage location to determine a new read-out label value; and
overwriting the temporary label value stored in the selected control data storage location with the new read-out label value to render both the selected control data storage location and corresponding key data storage location active for read-out; wherein the determination of the new read-out label value and overwriting the temporary label value are performed atomically.

* * * * *